(12) United States Patent
Oslizlo et al.

(10) Patent No.: US 9,643,573 B2
(45) Date of Patent: May 9, 2017

(54) WINDSCREEN WIPER DEVICE

(71) Applicant: Federal-Mogul Corporation, Southfield, MI (US)

(72) Inventors: Michael Oslizlo, Milan, MI (US); Dennis E. Cox, Belleville, MI (US)

(73) Assignee: Federal-Mogul LLC, Southfield, MI (US)

( * ) Notice: Subject to any disclaimer, the term of this patent is extended or adjusted under 35 U.S.C. 154(b) by 307 days.

(21) Appl. No.: 13/714,742

(22) Filed: Dec. 14, 2012

(65) Prior Publication Data
US 2013/0152325 A1    Jun. 20, 2013

Related U.S. Application Data

(60) Provisional application No. 61/570,563, filed on Dec. 14, 2011.

(51) Int. Cl.
*B60S 1/40* (2006.01)
*B60S 1/32* (2006.01)
*B60S 1/38* (2006.01)

(52) U.S. Cl.
CPC . *B60S 1/40* (2013.01); *B60S 1/32* (2013.01); *B60S 1/38* (2013.01); *B60S 1/3801* (2013.01);
(Continued)

(58) Field of Classification Search
CPC B60S 1/3801; B60S 1/381; B60S 2001/3815; B60S 1/3879; B60S 2001/3822
(Continued)

(56) References Cited

U.S. PATENT DOCUMENTS 2,767,419 A    10/1956 Horton
2,907,065 A    10/1959 MacPherson
(Continued)

FOREIGN PATENT DOCUMENTS

CA    1180515 A    1/1985
CN    1647980 A    8/2005
(Continued)

OTHER PUBLICATIONS

"Trico Teflon Shield", http://www.tricoproducts.com/Trade/WiperProducts/BeamBlades/TeflonShield; Dec. 12, 2012.
(Continued)

*Primary Examiner* — Larry E Waggle, Jr.
*Assistant Examiner* — Stephanie Berry
(74) *Attorney, Agent, or Firm* — Robert L. Stearns; Dickinson Wright, PLLC

(57) ABSTRACT

A windscreen wiper device for cleaning a windshield of a vehicle is provided. The windscreen wiper device includes a wiper strip extending in a longitudinal direction between opposite wiper strip ends, and the wiper strip is of a flexible material such as rubber for sealing against the windshield. At least one carrier element is disposed in the grooves and extends in a longitudinal direction between opposite carrier element ends. The windscreen wiper device further includes a frame structure including a plurality of claws in sliding engagement with the carrier element or elements and wherein the frame structure extends longitudinally past the ends of the wiper strip and the carrier element or elements. The frame structure includes a pair of flange portions that restrict the movement of the carrier element and the wiper strip relative to the frame structure.

9 Claims, 4 Drawing Sheets

(52) U.S. Cl.
CPC ........... B60S 1/3806 (2013.01); B60S 1/3879 (2013.01); B60S 1/3886 (2013.01); B60S 2001/382 (2013.01); B60S 2001/3813 (2013.01); B60S 2001/3843 (2013.01); Y10T 29/49826 (2015.01)

(58) Field of Classification Search
USPC ................. 15/250.44–250.4, 250.43, 250.38
See application file for complete search history.

(56) References Cited

U.S. PATENT DOCUMENTS

| | | | |
|---|---|---|---|
| 3,018,500 A * | 1/1962 | Anderson | B60S 1/3801 15/250.453 |
| 3,192,551 A | 7/1965 | Appel | |
| 3,317,946 A | 5/1967 | Anderson | |
| 4,028,770 A | 6/1977 | Appel | |
| 4,807,326 A | 2/1989 | Arai et al. | |
| 5,048,145 A | 9/1991 | Takahashi et al. | |
| 5,257,436 A | 11/1993 | Yang | |
| 5,325,563 A | 7/1994 | Cayan | |
| 6,000,093 A | 12/1999 | Charng | |
| 6,038,730 A | 3/2000 | Chen | |
| 7,373,688 B2 | 5/2008 | Aoyama et al. | |
| 7,526,832 B2 | 5/2009 | Matsumoto et al. | |
| 7,603,742 B2 | 10/2009 | Nakano et al. | |
| 7,636,980 B2 | 12/2009 | Nakano | |
| 7,775,337 B2 | 8/2010 | Moshenrose et al. | |
| 7,836,541 B2 | 11/2010 | Harita et al. | |
| 7,921,503 B1 | 4/2011 | Chiang | |
| 8,015,656 B2 | 9/2011 | Fujiwara et al. | |
| 8,151,406 B2 | 4/2012 | Machida et al. | |
| 8,181,308 B2 | 5/2012 | Kwon et al. | |
| 2007/0017055 A1 | 1/2007 | Simko | |
| 2007/0089257 A1* | 4/2007 | Harita | B60S 1/3801 15/250.04 |
| 2008/0028564 A1 | 2/2008 | Ku | |
| 2008/0098559 A1* | 5/2008 | Machida | 15/250.201 |
| 2008/0134456 A1 | 6/2008 | Choi | |
| 2008/0155776 A1 | 7/2008 | Harita | |
| 2009/0044365 A1 | 2/2009 | Koppen et al. | |
| 2009/0113653 A1 | 5/2009 | Thienard | |
| 2010/0139027 A1 | 6/2010 | An et al. | |
| 2010/0293738 A1 | 11/2010 | Kim et al. | |
| 2011/0041280 A1 | 2/2011 | Choi et al. | |
| 2011/0056041 A1 | 3/2011 | Wu | |
| 2011/0131750 A1* | 6/2011 | Kwon | B60S 1/3801 15/250.31 |
| 2011/0162161 A1 | 7/2011 | Amado | |
| 2011/0162162 A1 | 7/2011 | Fujiwara et al. | |
| 2011/0258802 A1 | 10/2011 | Op't Roodt et al. | |
| 2011/0265309 A1 | 11/2011 | Koppen et al. | |
| 2013/0133152 A1 | 5/2013 | Op't Roodt et al. | |

FOREIGN PATENT DOCUMENTS

| | | |
|---|---|---|
| CN | 101456407 A | 6/2009 |
| CN | 201357813 Y | 12/2009 |
| CN | 101654893 A | 6/2010 |
| CN | 101890919 A | 11/2010 |
| CN | 101959726 A | 1/2011 |
| CN | 101977800 A | 2/2011 |
| CN | 101992747 A | 3/2011 |
| CN | 102131682 A | 7/2011 |
| DE | 202006004273 U1 | 5/2006 |
| DE | 202011100429 U1 | 9/2011 |
| EP | 0236061 A2 | 9/1987 |
| EP | 2105362 A1 | 9/2009 |
| EP | 2338747 A2 | 6/2011 |
| FR | 2403243 A1 | 4/1979 |
| FR | 2781741 A1 | 2/2000 |
| FR | 2847311 A1 | 5/2004 |
| GB | 2234670 A | 2/1991 |
| JP | S38553 B | 1/1963 |
| JP | S5836748 A | 3/1983 |
| JP | S62270808 A | 11/1987 |
| JP | H0719032 U | 4/1995 |
| JP | H09164916 A | 6/1997 |
| JP | 2006117116 A | 5/2006 |
| JP | 2011116365 A | 6/2011 |
| JP | 2011251567 A | 12/2011 |
| WO | 2006051722 A1 | 5/2006 |
| WO | 2007091397 A1 | 8/2007 |
| WO | 2011152507 A1 | 12/2011 |

OTHER PUBLICATIONS

"Denso Designer Blade", http://www.densoaftermarket.com/wiperblades.php; Dec. 12, 2012.

* cited by examiner

WINDSCREEN WIPER DEVICE

CROSS REFERENCE TO RELATED APPLICATION

This application claims the benefit of application Ser. No. 61/570,563, filed Dec. 14, 2011, the entire contents of which is hereby incorporated by reference.

BACKGROUND OF THE INVENTION

1. Field of the Invention

The present invention is related generally to windscreen wiper devices for automobiles and more particularly to hybrid windscreen wiper devices.

2. Related Art

The majority of automotive windscreen wiper devices, or wiper blades, can be categorized as either conventional-style wiper blades (hereinafter referred to as "conventional blades") or beam-style wiper blades (hereinafter referred to as "beam blades"). Conventional blades typically include an elongated wiper strip; at least one carrier element (also known as a flexor); and a frame structure with a connecting device for attachment to a wiper arm, plurality of linkages and a plurality of claws. The carrier elements are generally linearly shaped when in a relaxed state, and the frame structure distributes a force from the wiper arm across the lengths of the carrier elements and the wiper strip while allowing the carrier elements and wiper strip to flex and conform to the curvature of a vehicle's windshield. This establishes a seal between the wiper strip and the windshield. Typically, either claws in the frame structure in is clamped into engagement with the carrier element or elements or the carrier elements are deformed on either side of one set of claws to prevent the wiper strip and carrier element or elements from detaching from the frame structure. Either of these configurations may be costly and also may restrict movement of carrier elements and the wiper strip relative to the frame structure.

Beam blades, in contrast to conventional blades, lack a frame structure. Instead, the carrier elements of beam blades are curved when in a relaxed state and the connecting device is attached directly to the carrier element or elements. When a beam blade is pressed against a windshield, the curved carrier elements conform the wiper strip to the curvature of the windshield and press substantially the entire length of the wiper strip against the windshield to establish the seal between the wiper strip and the windshield. Beam blades also typically include one or more spoiler elements, which use a flow of air over the beam blade to apply a down force on the carrier elements and the wiper strip while the vehicle is in motion to further press the wiper. Generally, at least a pair of end caps and the connecting device are clamped, latched, welded or staked into engagement with the carrier elements, which restricts movement of the carrier elements relative to these components. Typically, the end caps are deformed to include notches or other features which facilitate their connection with the end caps.

Some wiper blade manufacturers have begun producing and marketing "hybrid blades" which include certain features from both conventional and beam blades. Such hybrid blades typically include the frame structure similar to conventional blades, but the frame structure is covered by a spoiler-shaped cover piece that is disposed over the frame structure. This gives the otherwise conventional blade the down force effect of beam blades. Typical hybrid blades include a plurality of claws in engagement with one or more carrier elements with at least one set of those claws being clamped or otherwise latched into engagement with the carrier elements.

SUMMARY OF THE INVENTION

According to one aspect of the present invention, a windscreen wiper device for cleaning a windshield of a vehicle is provided. The windscreen wiper device includes an elongated wiper strip that extends in a longitudinal direction between opposite wiper strip ands and is of a flexible material for sealing against the windshield. The wiper strip presents a pair of grooves that extend in the longitudinal direction, and at least one carrier element is disposed in the grooves and extends in the longitudinal direction between opposite carrier element ends. The windscreen wiper device also has a frame structure having a plurality of claws in sliding engagement with the carrier element or elements and extending longitudinally past the ends of both the wiper strip and the carrier element. The frame structure further includes a pair of flange portions that restrict movement of the carrier element and the wiper strip relative to the frame structure. The flange portions prevent the wiper strip and carrier elements from becoming detached from the frame assembly without locking into engagement with the carrier elements or the wiper strip, which could create undesirable internal stresses in either of these components and lead to a reduction in durability and wipe quality.

According to another aspect of the present invention, the carrier elements have a generally constant cross-section extending along their entire lengths. This may provide for manufacturing advantages because no cutting process are required to form the notches or other special features that are commonly found in the carrier elements of other known wiper blade assemblies.

According to yet another aspect of the present invention, the flange portions are parts of a pair of end caps positioned on opposite ends of the windscreen wiper device.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
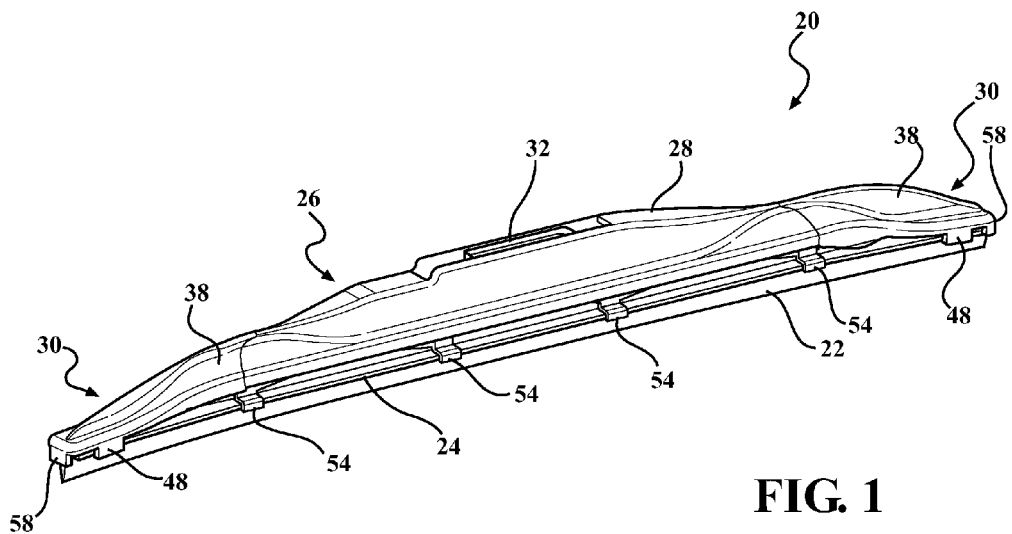
FIG. 1 is a perspective and elevation view of an exemplary wiper blade assembly.

Referring to the Figures, wherein like numerals indicate corresponding parts throughout the several views, an exemplary embodiment of a hybrid windscreen wiper device, or a hybrid wiper blade assembly 20, is generally shown in FIG. 1. The exemplary wiper blade assembly 20 includes a wiper strip 22 of a flexible and resilient material, such as rubber, for sealing against a vehicle's windshield and for driving rain, snow, ice or other elements away therefrom. The exemplary wiper strip 22 extends in a longitudinal direction between opposite wiper strip ends and includes a pair of oppositely facing grooves that extend substantially the entire longitudinal length of the wiper strip 22. A pair of carrier elements 24 (also known as flexors) are disposed in the grooves to bias the wiper strip 22 into a predetermined configuration. The carrier elements 24 are formed from thin strips of a flexible and spring-like material, such as spring steel, and extend in the longitudinal direction between opposite carrier element ends. Preferably, the carrier elements 24 are slidably disposed in the grooves and are not locked into engagement with the wiper strip 22. This configuration has the effect of relieving internal stresses within the wiper strip 22 when it is bent to conform to the curvature of a windshield (not shown) to improve the wipe quality and durability of the wiper blade assembly 20. Alternately, the carrier elements 24 may be locked into engagement with the wiper strip 22 in one location without substantially increasing internal stresses within the wiper strip 22.

Figure 2:
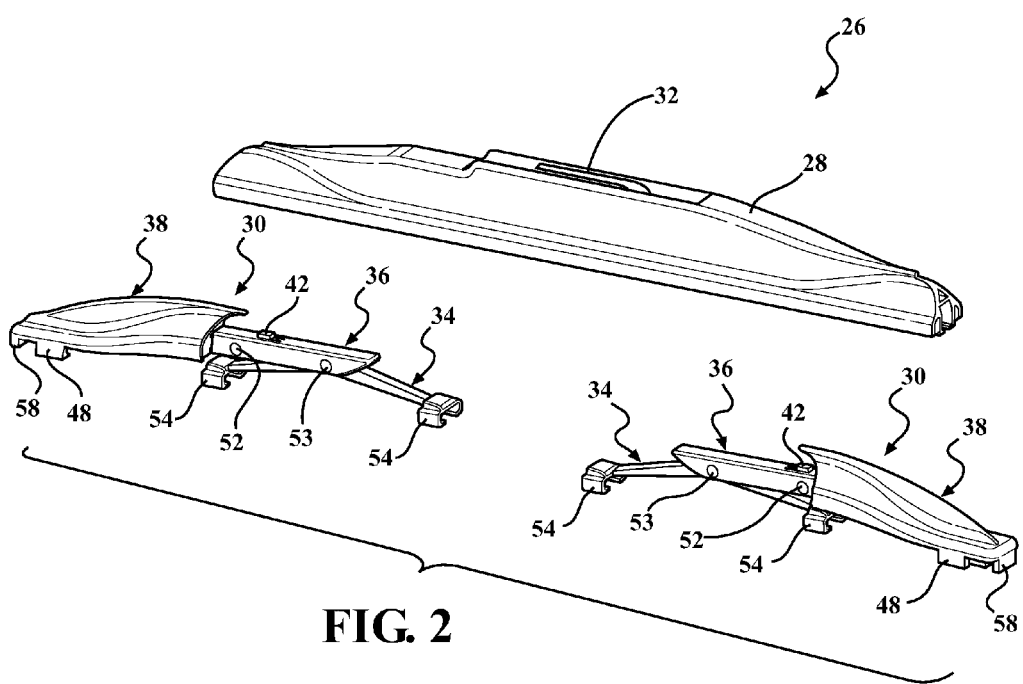
FIG. 2 is a partially exploded view of the wiper blade assembly of FIG. 1.

The exemplary wiper blade assembly 20 also includes a frame structure 26 which is coupled to the carrier elements 24 and distributes a force from a wiper arm (not shown) across a portion of the wiper strip 22 to seal that portion of the wiper strip 22 against the windshield. As best shown in the partially exploded view of FIG. 2, the exemplary frame structure 26 includes a main bridge 28 and a pair of end piece sub-assemblies 30 configured for attachment with opposite ends of the main bridge 28. A connecting device 32 is disposed in a generally central location of the main bridge 28 and is configured for attachment to an end of the wiper arm. It should be appreciated that the connecting device 32 could be of a range of different designs for attaching with different types of wiper arms including, for example, hook-style wiper arms, pin-style wiper arms or bayonet-style wiper arms.

Figure 3:
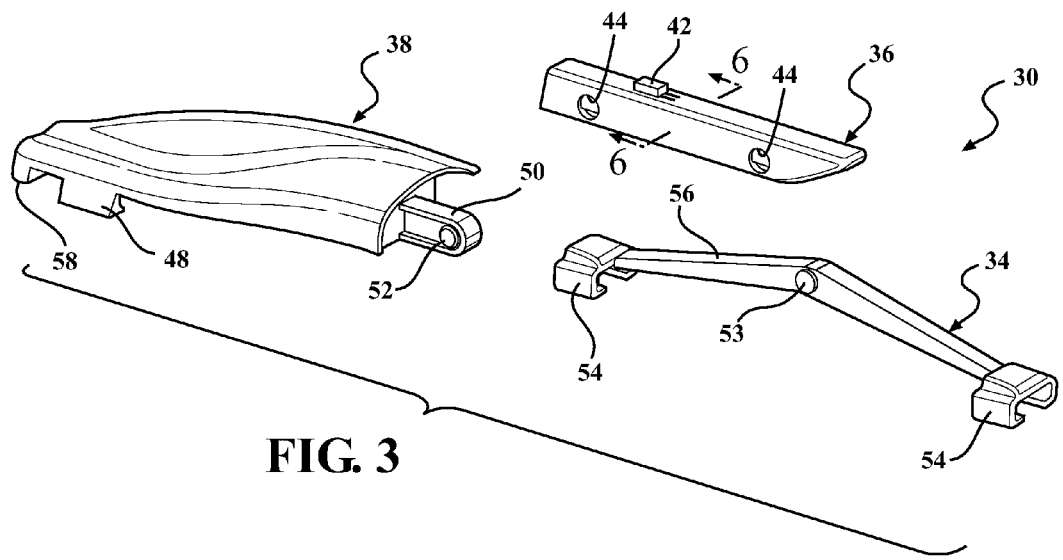
FIG. 3 is an exploded view of an exemplary end piece sub-assembly from the wiper blade assembly of FIG. 1.
Figure 7:
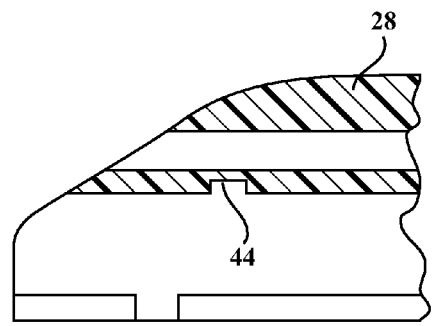
FIG. 7 is a cross-sectional view of the main bridge taken along line 7-7 of FIG. 6.

Referring now to FIG. 3, an exploded view of one of the end piece sub-assemblies 30 is shown. The exemplary end piece sub-assembly 30 includes a linkage 34, a connecting piece 36 and an end cap 38 (or end cover). The exemplary connecting piece 36 is generally U-shaped as viewed in cross-section and has an upper wall and a pair of side walls. The side walls include two sets of apertures 40 spaced from one another, and the upper wall has a spring loaded and resilient tab 42 (or a bayonet) which is located lengthwise between the sets of apertures 40. The spring loaded tab 42 is configured to snap into engagement with a recess 44 (shown in FIG. 7) that is shaped similarly to the spring loaded tab 42 and is disposed within the main bridge 28 to interconnect the end piece sub-assembly 30 with the main bridge 28.

Figure 4:
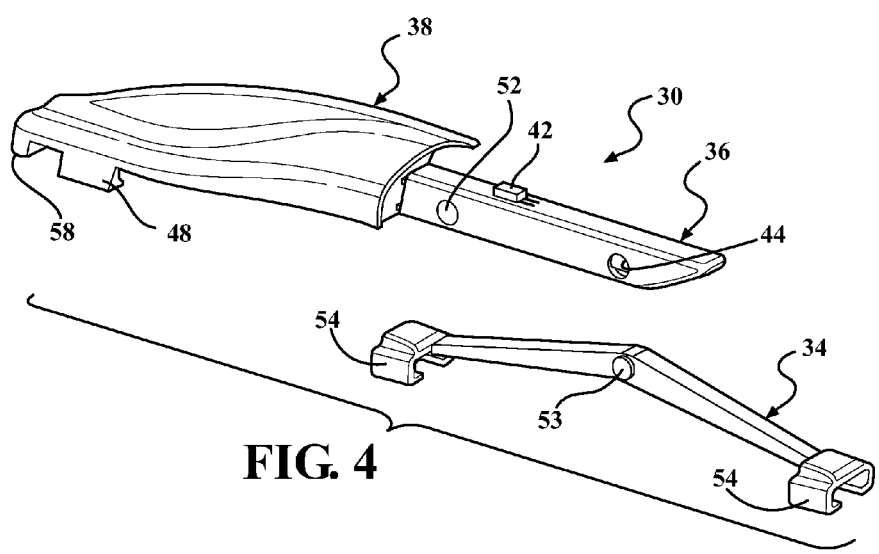
FIG. 4 is a partially exploded view of the end piece sub-assembly of FIG. 3 and showing two of the pieces being coupled together.

As shown, one end of the end cap 38 presents a pair of generally L-shaped holding elements 48 for wrapping partially around and supporting the carrier elements 24 (shown in FIG. 1) without restricting movement of the carrier elements 24 relative to the end cap 38 or the rest of the frame structure 26 in a lengthwise direction, i.e. the holding elements 48 are not fixed or otherwise latched onto the carrier elements 24. An outwardly extending tongue 50 with a pair of oppositely facing posts 52 is disposed on one end of the end cap 38. As shown in FIG. 4, the posts 52 on the tongue 50 are inserted into one of the sets of apertures 40 on the connecting piece 36 to establish a pivoting relationship between the end cap 38 and the connecting piece 36. As such, the end cap 38 is also pivotable relative to the main bridge 28. The open bottom of the connecting piece 36 allows the end cap 38 to pivot downwardly, and the upper wall of the connecting piece 36 serves as a stopping point to restrict pivoting of the end cap 38 upwardly.

Figure 5:
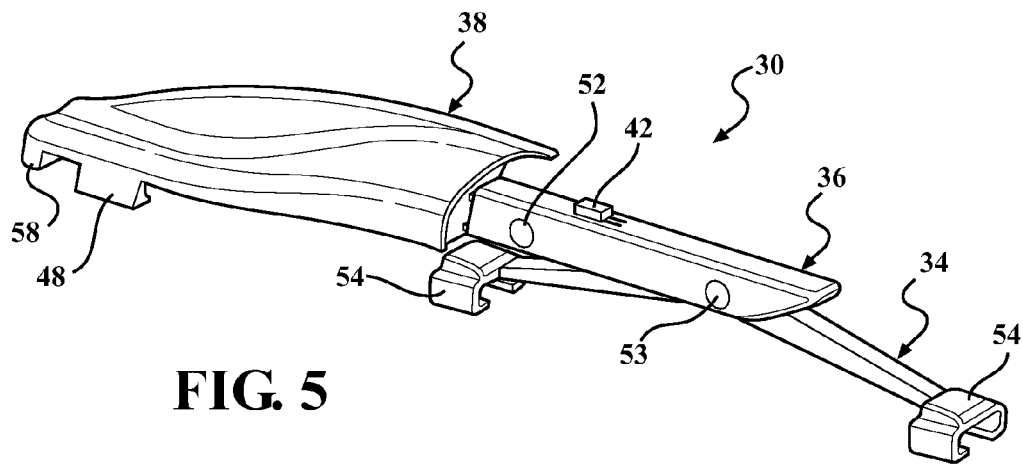
FIG. 5 is a perspective and elevation view of an end piece sub-assembly from the wiper blade assembly of FIG. 1.
Figure 6:
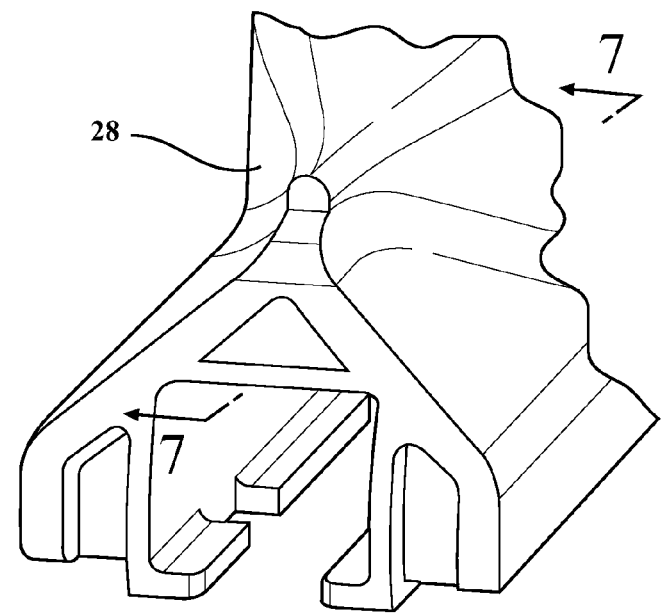
FIG. 6 is a perspective and fragmentary view of a portion of a main bridge from the wiper blade assembly of FIG. 1.

The linkage 34 of each end piece sub-assembly 30 includes two sets of claws 54 spaced apart from one another. The sets of claws 54 are interconnected with one another through a V-shaped bridge 56 which has a pair of oppositely extending posts 53 disposed at its apex. As shown in FIG. 5, the posts 53 are inserted into one of the sets of apertures 40 in the connecting piece 36 to establish a pivoting relationship between the linkage 34 and the connecting piece 36. The open bottom of the connecting piece 36 allows the linkage 34 to pivot in two directions. Similar to the holding elements 48 on the end caps 38, the claws 54 are in sliding (i.e., non-fixed) engagement with the exemplary carrier elements 24, thereby biasing the wiper strip 22 against the windshield while also allowing the carrier elements 24 and the wiper strip 22 to slide in a lengthwise direction relative to the linkages 34. This feature improves the wipe quality and durability of the wiper blade assembly 20 by reducing the internal stresses within the carrier elements 24 and the wiper strip 22 when they are bent to conform to the curvature of a windshield.

Referring back to FIG. 1, the exemplary frame structure 26 extends longitudinally past the ends of the carrier elements 24 and the wiper strip 22 on both sides of the wiper blade assembly 20. Specifically, in the exemplary wiper blade assembly 20, the end caps 38 extend past the ends of the carrier elements 24 and the wiper strip 22. Each end cap 38 has a downwardly extending flange portion 58 for restricting movement of the carrier elements 24 and wiper strip 22 relative to the frame structure 26. As such, the carrier elements 24 and wiper strip 22 may only slide relative to the frame structure 26 within the confines established by the flange portions 58 of the end piece sub-assemblies 30. Accordingly, the wiper blade assembly 20 is configured to prevent the wiper strip 22 or the carrier elements 24 from becoming detached from the frame structure 26. The flange portions 58 could either be spaced from the ends of the carrier elements 24 and the wiper strip 22 or they could abut the ends of the carrier elements 24 and the wiper strip 22 when the wiper blade is in a relaxed state. The downwardly extending flange portions 58 perform the important function of keeping the wiper strip 22 and carrier elements 24 from becoming detached without leading to internal stresses within the wiper strip 22 or the carrier elements 24, which is in contrast to other known wiper blade assemblies where at least one component, e.g. a claw, an end cap or a connecting device, is latched into engagement with the carrier elements.

Figure 8:
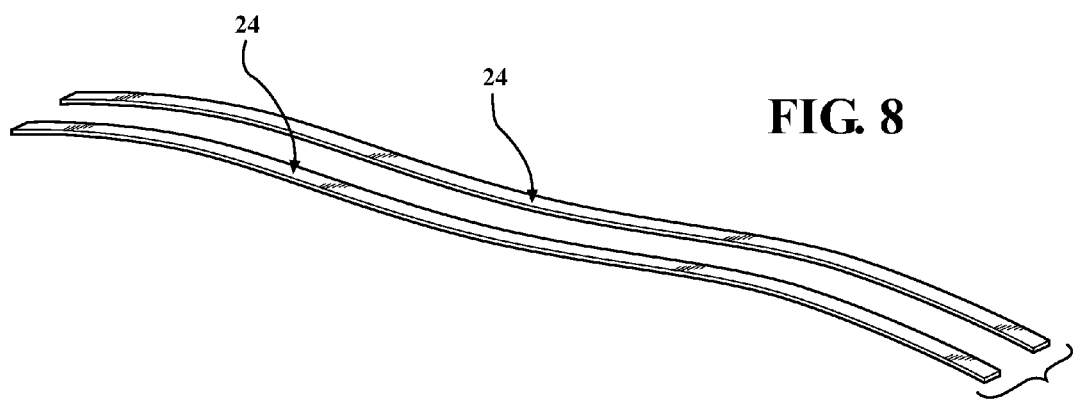
FIG. 8 is a perspective and elevation view of a pair of carrier elements from the wiper blade assembly of FIG. 1.

Referring now to FIG. 8, each of the carrier elements 24 is pre-shaped to be generally M-shaped with a pair of downwardly facing curves spaced from one another by an upwardly facing curve when it is in a relaxed, unstressed state before it is inserted into a groove in the wiper strip 22. This may have the effect of more uniformly pressing the wiper strip 22 against a curved windshield. However, it should be appreciated that the carrier elements 24 may be generally linearly biased or they could have any desirable curvature or curvatures when in the relaxed state. Each of the exemplary carrier elements 24 has a generally constant cross-section along its entire length, i.e. the carrier elements lack fingers or any other special features to engage other elements of the wiper blade assembly 20. This may provide for manufacturing advantages as compared to the other known wiper blade assemblies since the carrier elements 24 do not have to go through any cutting processes to create such features.

Referring back to FIG. 1, the exterior surfaces of the end caps 38 and the main bridge 28 are generally spoiler shaped. This creates a down force to further bias the wiper strip 22 against the windshield and improve the seal established therebetween and improve the wipe quality when the vehicle is travelling at speeds. In the exemplary embodiment, this aerodynamic down force is substantially the only biasing force applied onto the carrier elements 24 and the wiper strip 22 by the end caps 38 which are freely pivotable relative to the main bridge 28, i.e. any biasing by the end caps 38 onto the carrier elements 24 and the wiper strip 22 from the force of gravity is not substantial.

Obviously, many modifications and variations of the present invention are possible in light of the above teachings and may be practiced otherwise than as specifically described while within the scope of the appended claims.

What is claimed is:

1. A windscreen wiper device for cleaning a windshield of a vehicle, comprising:
    an elongated wiper strip extending in a longitudinal direction between opposite wiper strip ends and being of a flexible material for sealing against the windshield;
    said wiper strip presenting a pair of grooves extending in said longitudinal direction;
    a carrier element disposed in said grooves and extending in said longitudinal direction between opposite carrier element ends;
    a frame structure including a plurality of claws in sliding engagement with said carrier element and wherein said frame structure extends longitudinally past both of said wiper strip ends and both said carrier element ends;
    wherein said frame structure includes a pair of flange portions that restrict the movement of said carrier element and wiper strip relative to said frame structure;
    wherein said carrier element has an at least substantially entirely constant cross-section along its entire length;
    said frame structure including a main bridge and a pair of end piece sub-assemblies that are coupled to opposite ends of said main bridge, each of said end piece sub-assemblies including an end cap with one of said flange portions, each of said end piece sub-assemblies including a linkage with two sets of claws that are spaced from one another, and each of said end piece sub-assemblies including a connecting piece interconnects said linkage and said end cap with said main bridge;
    said end cap of each end piece sub-assembly being pivotable relative to said connecting piece about a first pivot point and said linkage being pivotable relative to said connecting piece about a second pivot point that is spaced from said first pivot point;
    wherein said end cap of each end piece sub-assembly is movable relative to said main bridge independently of said linkage of the respective sub-assembly; and
    wherein each of said connecting pieces includes a spring loaded tab for snapping into engagement with said main bridge to interconnect said connecting piece with said main bridge and wherein said spring loaded tab is located in the longitudinal direction between said first and second pivot points and wherein said spring loaded tab is covered by said main bridge to prevent detachment of said end piece sub-assembly from said main bridge.

2. The windscreen wiper device as set forth in claim 1 wherein said flange portions extend in a downward direction.

3. The windscreen wiper device as set forth in claim 1 wherein each of said end caps includes at least two holding elements wrapping partially around said carrier element and spaced longitudinally from said flange portion.

4. The windscreen wiper device as set forth in claim 3 wherein said holding elements are generally L-shaped.

5. The windscreen wiper device as set forth in claim 1 wherein said connecting piece of each end piece sub-assembly includes sets of apertures for receiving posts on said end cap and said linkage to establish said first and second pivot points between said end cap and said connecting piece and between said linkage and said connecting piece respectively.

6. The windscreen wiper device as set forth in claim 1 wherein each of said connecting pieces is generally U-shaped as viewed in cross-section with a pair of side walls and an upper wall.

7. The windscreen wiper device as set forth in claim 5 wherein said apertures on said connecting pieces are on said side walls.

8. The windscreen wiper device as set forth in claim 1 wherein said carrier element includes a pair of longitudinal strips.

9. The windscreen wiper device as set forth in claim 1 wherein said frame structure is generally spoiler shaped.

* * * * *